H. R. PRIEST.
DEMONSTRATING DEVICE.
APPLICATION FILED OCT. 3, 1911.

1,034,297.

Patented July 30, 1912.

Witnesses

Inventor
H. R. Priest
By
A. W. Stacy
Attorney.

UNITED STATES PATENT OFFICE.

HARRY R. PRIEST, OF LOUDONVILLE, OHIO.

DEMONSTRATING DEVICE.

1,034,297.  Specification of Letters Patent.  Patented July 30, 1912.

Application filed October 3, 1911. Serial No. 652,587.

*To all whom it may concern:*

Be it known that I, HARRY R. PRIEST, citizen of the United States, residing at Loudonville, in the county of Ashland and State of Ohio, have invented certain new and useful Improvements in Demonstrating Devices, of which the following is a specification.

This invention relates to a demonstrating device for use in demonstrating the suction action of the plates of false dentures, and is more particularly designed for use in demonstrating denture plates of that type provided with suction cups of rubber, or similar material. It is a well-known fact that such denture plates embody advantages over the ordinary or old style of plate in which the adherence of the plate to the roof of the mouth and gums was dependent solely upon the concave surface portions of the plate, but it has been found difficult to explain to the laymen just why a denture plate provided with a suction cup, such as above mentioned, will adhere more firmly to the roof of the mouth and to the gums.

The invention, therefore, contemplates the provision of a demonstrating model of transparent material, which model has a surface conforming in contour substantially to the contour of the roof of the mouth or to the contour of the gums, as the case may be, the artificial denture plate to be demonstrated being adapted to be disposed against this surface of the model and the action of the suction cup noted by looking through the model from the opposite side thereof.

For a full understanding of the invention reference is to be had to the following description and accompanying drawing, in which:—

Figure 1:
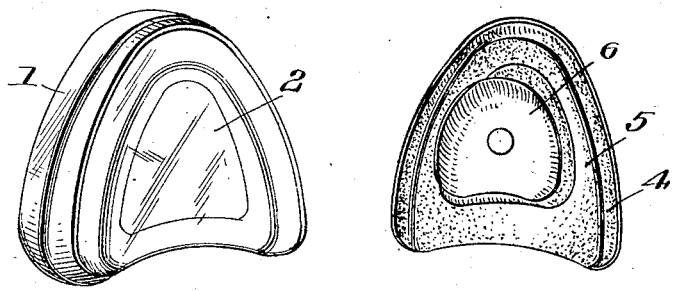
Figure 2:
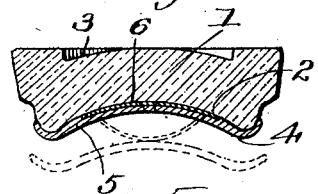
Figure 3:
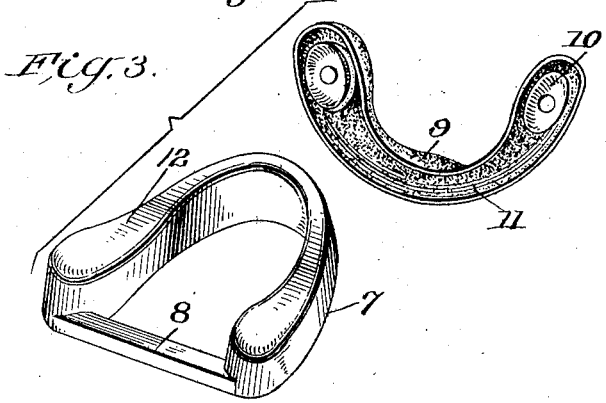

Figure 1 is a group perspective view illustrating a demonstrating model embodying the present invention and designed for use in demonstrating an upper denture plate, and also illustrating the said denture plate. Fig. 2 is a transverse sectional view through the model and denture plate. Fig. 3 is a group perspective view similar to Fig. 1 illustrating the form of model used in demonstrating a lower denture plate, the said lower denture plate being also shown in this figure.

Corresponding and like parts are referred to in the following description and indicated in all the views of the accompanying drawing by the same reference characters.

The demonstrating model for use in demonstrating an upper denture plate is clearly shown in Figs. 1 and 2 of the drawing, and is indicated in general by the reference numeral 1. This model is preferably molded of glass although other vitreous transparent material may be employed and the model has an under face 2 which conforms in contour to the roof of the mouth. The upper surface of the model is indicated by the numeral 3 and may be flat or may correspond to the contour of the side 2 of the model if desired. In any event, the surface 2 is smooth and non-porous.

The upper denture plate to be demonstrated by the use of the model 1, is illustrated in Figs. 1 and 2 of the drawings, and indicated by the numeral 4, and being provided with an upper surface 5 of a contour to fit against and to conform to the contour of the surface 2 of the demonstrating model 1 and being provided on its said upper surface with a suction cup 6 of soft rubber or other material suitable for use in this connection. The under surface 2 of the demonstrating model 1 being smooth and non-porous when the denture plate 4 is disposed thereagainst in the same manner as it would be against the roof of the mouth, the cup 6 will be flattened out and the air will be expelled from between the same and the said surface of the model 1, the denture plate and cup then resting against the under surface of the model in the manner shown in Fig. 2 of the drawings. The person to whom the action of the suction cup 6 is being explained, may then view the said cup through the model by looking at the side 3 of the model, and the one demonstrating the denture plate may slightly pull the plate away from the surface 2 of the model to about the dotted line position shown in Fig. 2 of the drawing, so as to demonstrate the fact that the cup will hold firmly to the model (which takes the place of the roof of the mouth) even though some little effort is made to remove it from the model.

The demonstrating model used in demonstrating the lower denture plate is indicated in Fig. 3 of the drawing by the numeral 7 and is of substantially the same contour as the lower gums and, like the model 1 is formed of glass or other suitable material. The ends of this model are preferably connected and braced by a cross-bar 8 also of glass. The denture plate to be demonstrated upon this model 7 is indicated in Fig. 3 by the reference numeral 9 and is provided at each end with a suction cup 10, these cups being located upon the under surface of the said plate 9 in the manner illustrated in the said Fig. 3 and this said under surface being concave as at 11 to fit over the upper surface 12 of the model 7 and conform to the contour thereof. It will be readily understood that the suction cups 10 will adhere to the surface 12 of the model 7 at the ends of the model in the same manner as does the cup 6 to the under surface 2 in the model 1 in the previously described form of the invention and that the action of the cups 10 in holding the lower denture plate in place may be viewed through the ends of the model 7.

From the foregoing description of the invention it will be readily understood that there is provided an extremely simple demonstrating device for the purpose specified, which device may be readily employed to clearly demonstrate to a patient the exact manner in which the suction cups and denture plates act in holding these plates to the roof and gums of the mouth. It will also be understood from the foregoing that while there is a decided advantage in forming the demonstrating models from transparent material, these models may be formed of porcelain or other material which is not transparent, but which is vitreous or non-porous where it is not considered essential that the action of the suction cups of the denture plates may be actually viewed. However, as stated, the use of a transparent material is one of the essential features of the preferred form of the invention.

Having thus described the invention what is claimed as new is:—

1. A device for demonstrating the suction action of artificial dentures consisting of a transparent model having a surface conforming to the suction surface of such a denture.

2. A demonstrating device for use in demonstrating the suction action of artificial denture plates comprising a model of transparent non-porous material having a surface conforming to the contour of the suction side of the said denture plate to be demonstrated.

In testimony whereof I affix my signature in presence of two witnesses.

HARRY R. PRIEST. [L. s.]

Witnesses:
MARTIN J. HOFFMAN,
W. S. HISSUN.

---

Copies of this patent may be obtained for five cents each, by addressing the "Commissioner of Patents, Washington, D. C."